United States Patent
Quintuna

(10) Patent No.: US 8,914,441 B2
(45) Date of Patent: Dec. 16, 2014

(54) SYSTEM AND METHOD FOR IMPLEMENTING DYNAMIC ACCESS CONTROL RULES TO PERSONAL CLOUD INFORMATION

(75) Inventor: Xavier Quintuna, San Francisco, CA (US)

(73) Assignee: Orange, Paris (FR)

(*) Notice: Subject to any disclaimer, the term of this patent is extended or adjusted under 35 U.S.C. 154(b) by 413 days.

(21) Appl. No.: 13/307,164

(22) Filed: Nov. 30, 2011

(65) Prior Publication Data

US 2012/0136936 A1 May 31, 2012

Related U.S. Application Data

(60) Provisional application No. 61/418,070, filed on Nov. 30, 2010.

(51) Int. Cl.
| | |
|---|---|
| G06F 15/16 | (2006.01) |
| G06Q 30/02 | (2012.01) |
| G06Q 10/10 | (2012.01) |
| H04L 29/06 | (2006.01) |
| G06F 21/60 | (2013.01) |
| H04L 29/08 | (2006.01) |
| G06F 21/62 | (2013.01) |

(52) U.S. Cl.
CPC .............. *G06Q 30/02* (2013.01); *G06Q 10/107* (2013.01); *H04L 63/104* (2013.01); *G06F 21/604* (2013.01); *H04L 67/22* (2013.01); *H04L 67/306* (2013.01); *G06F 21/6245* (2013.01)
USPC ........................................... 709/204; 206/224

(58) Field of Classification Search
USPC ........................................ 709/204, 206, 224
See application file for complete search history.

(56) References Cited

U.S. PATENT DOCUMENTS

| | | | | |
|---|---|---|---|---|
| 7,860,525 | B2* | 12/2010 | Parkkinen et al. ............ | 455/518 |
| 7,890,871 | B2* | 2/2011 | Etkin ............................ | 715/738 |
| 2005/0198021 | A1* | 9/2005 | Wilcox et al. ..................... | 707/3 |
| 2007/0174394 | A1* | 7/2007 | Jayaweera .................... | 709/206 |
| 2009/0222750 | A1* | 9/2009 | Jain et al. ...................... | 715/767 |
| 2009/0228486 | A1 | 9/2009 | Kuehr-McLaren et al. | |
| 2010/0005518 | A1 | 1/2010 | Tirpak et al. | |
| 2011/0161429 | A1* | 6/2011 | Marcus et al. ................ | 709/206 |

* cited by examiner

*Primary Examiner* — Thomas Dailey
(74) *Attorney, Agent, or Firm* — Drinker Biddle & Reath LLP

(57) ABSTRACT

A system and method are provided for sharing data of a user with contacts, the method comprising collecting the contacts from the user, collecting data related to the communications between the user and his contacts, and automatically grouping the contacts into different groups based on a level of communications between the user and the user's contacts, defining an access level for each group, with each access level granting access to some part of the user's data based on the access level. Advantageously, this permits a dynamic assignment of authority to access content that does not have to be actively managed by the user.

17 Claims, 13 Drawing Sheets

SYSTEM AND METHOD FOR IMPLEMENTING DYNAMIC ACCESS CONTROL RULES TO PERSONAL CLOUD INFORMATION

CROSS REFERENCE TO RELATED APPLICATIONS

The present application claims the benefit of U.S. Provisional Application No. 61/418,070, filed Nov. 30, 2010, entitled, "System and Method for Implementing Dynamic Access Control Rules to Personal Cloud Information", herein incorporated by reference.

BACKGROUND

A system and method are provided that allow access control rules relating to personal cloud information to be determined dynamically, resulting in group memberships that change over time based on criteria that incorporates communications between the user and his or her contacts.

Social networks, such as Facebook, LinkedIn, and others, have become popular in the past several years. In these networks, users are permitted to store and share information in a controlled manner, so that only those individuals with whom the user wishes to share certain information can actually access it.

In these networks, a user may designate different groups, or classes, of individuals, and then may define access permissions based on these defined groups. Therefore, only members of a particular group may be authorized to access a particular piece of information. By way of example, a user may designate a group called "real friends", then assign Bob to the group of good friends. The user can then designate his cell phone number as only viewable by good friends, and Bob (but not others who are not members of the "real friends" group) will subsequently have access to the user's cell phone number.

In addition to having a user manually define such groups and then subsequently define group membership, it is also possible to have group membership in predefined groups allocated based on some criteria that can be determined automatically.

For example, it is known to utilize social network thresholds that can be determined automatically with regard to access control decisions. If a second user does not have an appropriate privilege level to access a particular piece of information, then a statistical threshold for access can be determined based on social networking statistics, such as a number or percentage of users listed as friends by a content owner.

SUMMARY

A method is herein provided for sharing data of a user with contacts, the method comprising collecting the contacts from the user, collecting data related to the communications between the user and his contacts, automatically grouping the contacts into different groups based on a level of communications between the user and the user's contacts, defining an access level for each group, with each access level granting access to some part of the user's data based on the access level, and notifying each member of each group of contacts having been granted access to that part of the user's data based on the access level when that data has become accessible or has changed. Advantageously, this permits a dynamic assignment of authority to access content that does not have to be actively managed by the user.

A non-transitory computer program product is also provided, comprising a computer usable medium having a computer readable program code embodied therein, said computer readable program code adapted to be executed to implement the method.

A server device is also provided for sharing data of a user with contacts, the server device comprising: a storage element configured to store contacts collected from said user; a storage element configured to store data related to communications between the user and his contacts; and a processor configured to run: an algorithm that automatically groups the contacts into different groups based on a level of communications between the user and the user's contacts; and an algorithm that defines an access level for each group, with each access level granting access to some part of the user's data based on the access level.

A system is also provided comprising the server device, a client device comprising a reader configured to read the part of the user's data; and a network that connects the client device to the server device.

Various embodiments of the invention involve automatically generating access control rules (ACL rules) based on a user's true connection to his friends. The contacts are collected over the different sources provided by the user, such as emails, phone contacts, and SN friends. Based on the number of emails, phone calls, interactions over the SN, contacts are divided into a number of groups, e.g., from real friend, to occasional friend, and temporary friend. Different access rights are defined for each of these groups. The user simply has to drag his content to folders associated with each of the generated access rights. The corresponding users are notified and they can access to these folders by virtue of the access rights (using, e.g., a universal ID, or OpenID).

DEFINITIONS

The following definitions are used for the discussion below:
API Application Programming Interface
SN Social Network
ACL Access Control List
OpenID OpenID is an open, decentralized standard for authenticating users
DyACL Dynamic Access Control List
UI User Interface
DLNA Digital Living Network Alliance. A standard used to allow entertainment devices within the home to share their content with each other across a home network
NAS Network Attached storage
SNG Social Network Gateway: Orange's service platform offering API translation and interconnection services with a selection of Internet Social Networks
STB Set Top Box. Device connected to a TV set and offering TV services through a broadband connection.
Third-Party Internet service supplied by third party (e.g. Picasa, Facebook . . . )
online
service
UpnP Universal Plug and Play. Networking protocols allowing devices to connect seamlessly in the home P.C Personal Cloud
OAuth Open Authorization is an open standard that allows users to share their private resources stored on one site with another site without having to hand out their credentials
UGC user generated content
SLA service layer agreement The system described below, herein referred to as "Personal Cloud", is a trusted and secure user-centric platform providing a trusted environment for users to consolidate and manage their personal data. Personal Cloud allows users to regain access and control over their personal user generated content, including their personal preferences, internet click-streams, as well as digital artifacts like photos, videos and music. Further, users are able to apply only the relevant aspects of their personal profile data towards personalized services, ensuring the ownership of the data is maintained and services are only being provided this data in exchange for highly personalized experiences they provide.

By way of example only, the system is described in an architecture that is based on the Tonido (CodeLathe) platform, however the scope of the invention extends beyond this embodiment, and can extend across the web, including social networks, e-commerce sites and any other online services available today. The system provided, as described below, enables users to greatly simplify their online experience. The system may utilize OpenID, which is a significant factor in enabling Personal Clouds for users.

BRIEF DESCRIPTION OF THE DRAWINGS

The invention is illustrated by reference to various embodiments illustrated in the drawings and described in more detail below.

DETAILED DESCRIPTION

Figure 1:
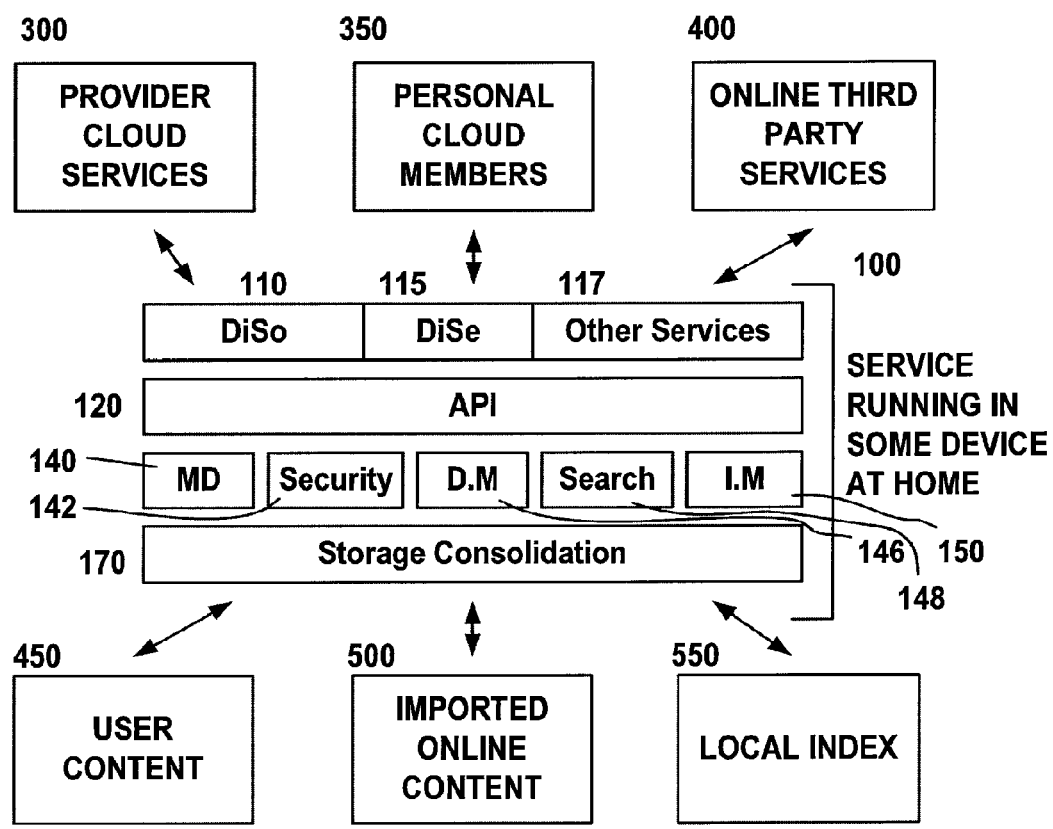
FIG. 1 is a block diagram illustrating the personal cloud architecture.

The Personal Cloud (P.C) architecture is illustrated at a high level in FIG. 1. The P.C 100 is a service running at user premises that provides a secure and trusted environment for user generated content. It manages user content generated, identities and personalized services. The P.C 100 is thus becomes a user content broker between user and content associated with the user 450, 500, 550, and third party online services 400.

At a high level the P.C 100 provides a user experience to sharing online data by implementing a Distributed Social Network (DiSo) function 110, a Distributed Search (DiSe) function 115, and other user services 117 through an application program interface (API) 120. A media delivery optimization module 140 may be provided to optimize transcoding and improve the quality of service of streaming media. Security 142 may be provided by way of OpenID and OAuth. The sharing function may be implemented via Data Management (D.M) 146 and utilize DyACL. A search function 148 to search for content in the cloud may be provided. An Identity Management (I.M) 150 may also be provided. The P.C 100 may also include a mechanism for device discovery and may provide for some form of rule-based content notification. Storage consolidation 170 is also provided to aggregate user information.

Communication access is provided to specific cloud service providers 300, to other personal cloud members 350, and a simple integration is provided to on-line third party service providers 400, such as Facebook, Flickr, and YouTube.

The P.C 100 provides access to user content 450, which can include any content generated by users that can be stored in any device compatible with the Digital Living Network Alliance (DLNA) (www.dlna.org) or that may plug to the network. It may also provide access to imported online content 500, which can include any content that has been uploaded to third party on-line services. The user can import this content from the third party and either move it back to the personal cloud or provide only indexed access. Finally, the P.C 100 can provide access to a local Index 550 comprising metadata related to all the information, location, and access control lists (ACL) of content.

Tonido™ System

Figure 2:
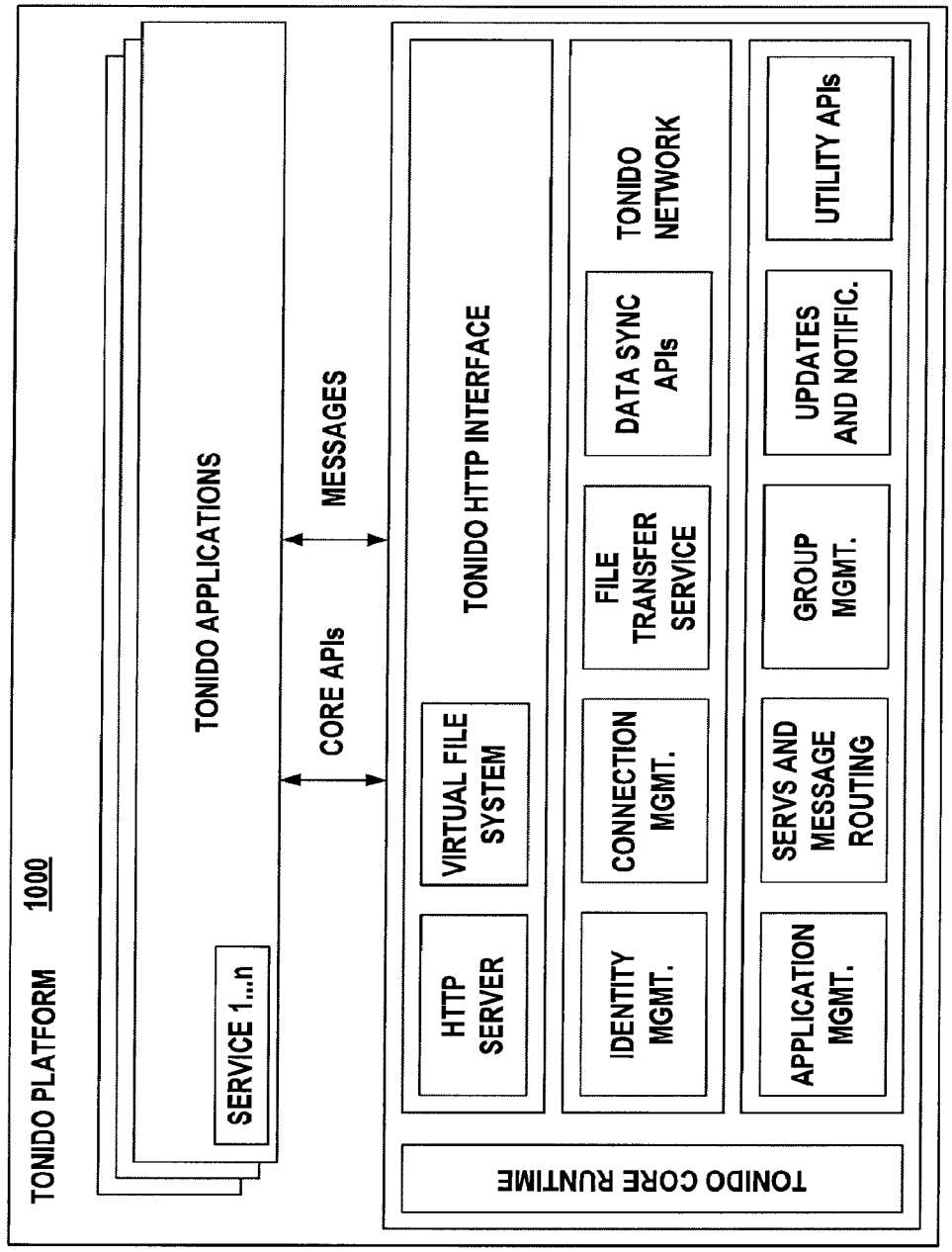
FIG. 2 is a block diagram illustrating the Tonido core components.

The present system can be based on a platform provided by CodeLathe called Tonido™ of which the basic components are illustrated in FIG. 2. The Tonido system 1000 is a person-to-person (P2P) personal web application platform that allows a user to access and share all of the user's desktop files, documents, photos, music and videos from anywhere.

Tonido offers the following features: P2P support for communication between Tonido instances, access to content from anywhere, available anytime access to the Tonido application online or offline, secure communication-encrypted data transfer, support to multiple operative systems, and an API and software development kit (SDK) to build applications on top of the platform.

There are two main software components in Tonido: the first is the Tonido Runtime platform, which is installed on the end user device destination; and the second is the Tonido Domain Server (TDS), which is responsible for managing authentication, custom URL to IP address mapping and connection brokering.

The Tonido runtime platform is installed on the end user machine. It consist of two components: the first is the Tonido Core, which is the primary software component that provides programmable APIs and manages and provides HTTP and P2P connectivity. The second is Tonido applications—these are shared libraries/dlls that are loaded/unloaded dynamically.

Tonido has two primary interfaces to the outside world: the first is the HTTP interface (which is the user interface), and the second is the Tonido network interface, which is used to connect to other Tonido instances.

Figure 3:
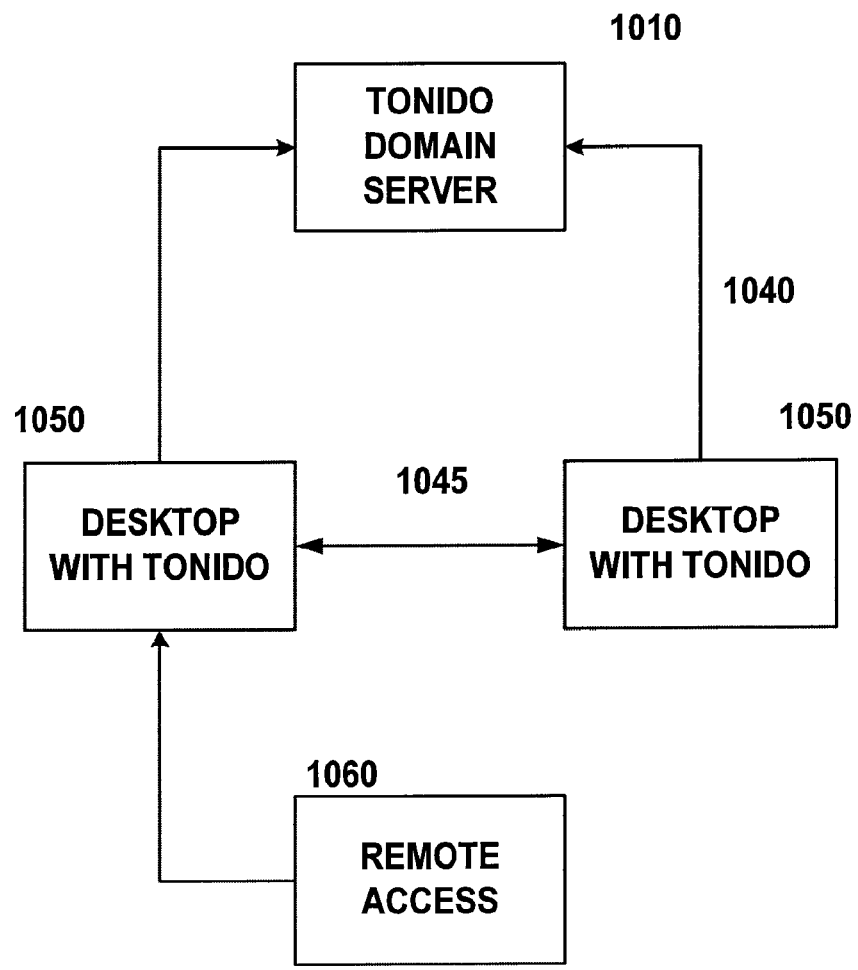
FIG. 3 is a block diagram illustrating access to a Tonido Domain Server.

FIG. 3 is a block diagram illustrating the Tonido Domain Server (TDS) 1010. The TDS 1010 is designed to be an open system similar to email. Users can create accounts in any TDS run by anyone and communicate and collaborate with any other Tonido instance running on a different TDS. A user can remotely access 1060 a desktop with Tonido 1050, and these can communicate with the TDS 1010.

TDS operates on well-known Internet Engineering Task Force—(IETF) approved ports 24465 for user datagram protocol (UDP) (which may be used as the control link 1040 and data link 1045) and 24465 for transmission control protocol (TCP) (HTTPS).

The TDS 1010 has the following functions. First it performs authentication, which includes: 1) Identifying a Tonido instance (or a device or user) uniquely; 2) creating a Tonido ID (this is done via an HTTPS connection to the TDS; and 3) assigning a unique secret key to the Tonido Runtime. Second, it performs URL to IP address mapping, with a custom URL being based on the domain the TDS 1010 is running on (dynamic DNS). Third, it performs connection brokering. The TDS 1010 serves as an intermediary to broker P2P connection setup between two Tonido instances. The TDS allows two instance to establishes a direct P2P connection (network address translator (NAT) punching).

Personal Cloud

One aspect of the Personal Cloud is the User Experience. The Distributed Social Networks element DiSo 110 is decentralized and distributed across different providers, that emphasizes portability and interoperability. Currently there are multiples open standards associated with the distributed social networks. In a preferred embodiment, OpenID and OAuth are the standards utilized, although other open standards may be utilized as well.

With this element, personal cloud members 350 are able to share and access content from other members without downloading the content based on some kind of ACL. Although the Personal Cloud could search content from the user's friends and itself, there is no anonymous search—thus, the content is always attached to some personal cloud members 350.

It is possible for the P.C member to set up notification rules for sending automatic notifications to other members of the P.C regarding any new content associated with the member. Also, the P.C member can publish to his/her favorite social network an indication of the existence of new media content. When a member of the social network (SN) tries to access the P.C content, the member will be redirected to the user's Personal Cloud where the new media content is hosted. Also, P.C members can subscribe to have a feed of their friends activities.

Figure 4:
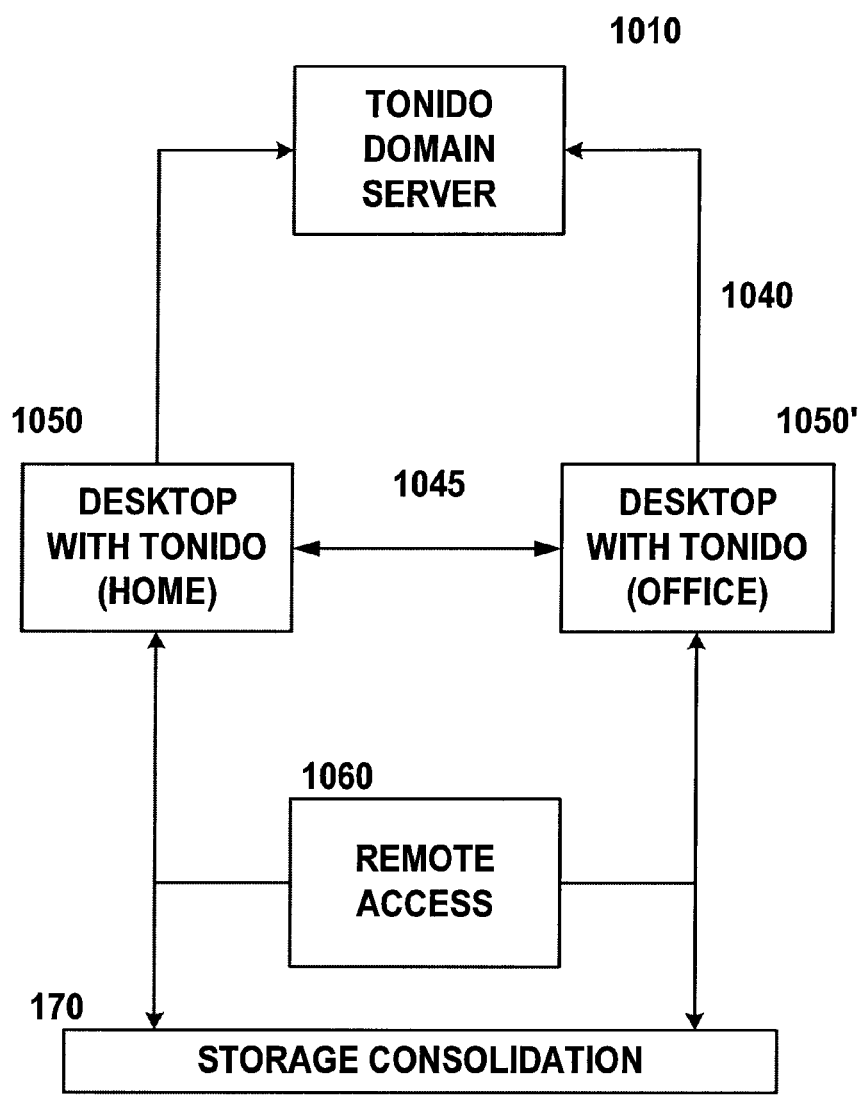
FIG. 4 is a block diagram illustrating storage consolidation according to an embodiment.

The storage consolidation 170 has two parts to it. First, there are physical storage devices that include all content stores in any device with local storage. Using P2P technology a user could map the personal cloud identity with multiple devices. Such devices send a representation of their file system. This permits the user to be able to navigate all the content store in the different file system with one unified view. Second, there are online data stores, which include all of the different online data stores (social network, photo sharing, video sharing, etc.) that the users upload content to. FIG. 4 illustrates the use of the Tonido system 1000 with the present storage consolidation 170 to which clients can push content.

As to physical storage devices, for DLNA universal plug and play (UPnP) devices, personal cloud members can have an aggregated view of the content stored in any device compatible with DLNA/UPnP. For a non-DLNA device, personal cloud members can have an aggregate view of all the content stored in devices that are running a Tonido instance.

With regard to online data stores, personal cloud members can aggregate different online data stores (social networks, photo sharing, video sharing, etc.). A personal cloud member can import and log their content generated from different online data stores (e.g., twitter, posts, comments, photos, videos, etc.) to their personal cloud.

This system thus provides the following beneficial functionality: access from/to any file located in the personal cloud; storage of any file from any device to the personal cloud; deletion of any file stored at the personal cloud; moving content between devices; adding or removing a device from the storage consolidation; and some form of authentication between the device and the personal cloud.

User Experience/User Interface

An important part of the user experience involves the user interface. The service that manages and orchestrates private user content is referred to herein as the Personal Assistant. Preferably, the Personal Assistant provides access, preferably via a web browser interface, to the exemplary user experiences/functionalities illustrated in the table below.

The user interface may be implemented as a series of folders that are shown to the user, each of which is associated to a group of contacts. By way of example for associating contacts with folders, in an associating function, a list of folders can be shown in one windows and a list of contacts can be provided to the user in another window. The user can then select one or more contacts and simply drag them to a particular folder, thereby associating that folder with the selected users. Similarly, the user can select one or more folders and drag them to a particular user, thereby associating that user with the selected folder. Any mechanism can be used to associate the users with the folders.

Advantageously, in a content updating process, when the user updates content in a folder (e.g., by dragging and dropping content into the folder), the users associated with the folder are notified of the content update in a manner described in more detail below.

TABLE 1

| User Experiences/Functions | |
|---|---|
| User Experience | Description |
| Home | Helps users to select any of the different options from the personal cloud: <br> Me (Identity Manager) <br> Files (Storage consolidation) <br> Media (All the media content from the storage consolidation) <br> MyPeople (Dynamic ACL) <br> MyApps (a feature for personalized services) <br> Search (local search) |
| Identity Manager | Manages user online identity: <br> Email accounts <br> Social network <br> Personal cloud ID (openID) <br> Mobile <br> Cloud devices |
| Dynamic ACL | Provides a map between users and folders. This map is based on an algorithm that analyzes a social graph of the user, their email, or a related aspect. In addition, Dynamic ACL controls publishing content to outside services (SN) or Personal Cloud members. |
| Device Source | Shows original devices or location of the content, and shared content by others. |
| Device destination | Shows the final destination where the content will be consumed or moved. |
| Authentication | Allows a user to provide openID accounts to other users that are not members of the personal cloud. |
| Content | Shows the content based on some data representation. |

TABLE 1-continued

User Experiences/Functions

| User Experience | Description |
|---|---|
| Files | Shows all of the content from different devices. This is the representation of the storage consolidation and the content that has been shared. |
| Views | User may have different ways to visualize the content, that differential between format and layout of content. |
| Media/music/Recommendations | Music recommendations can be extracted using, e.g., Freebase (www.freebase.com), which is a REST/JSON service that provide free information. |
| Media/music/Media Content Information | Display information related to a track of music, e.g., album, track name, length, album art. |
| Media/music/Play list | Shows different playlists from all the content store in the storage consolidation, such as ITunes, Window Media Player, and others. This also allows the user to do the following: create a new playlist, delete music, play a playlist in a destination device, and share the playlist with other friends. |
| Media/Video/Horizontal video content browsing | Helps the user to browse media content and select the content to play. |
| Media/Video | User can share one or more videos (stream content), perform transcoding, and send media to an other device destination. |
| Media/Photos/Album | User can create albums with photos located from different devices. |
| Media/Photos | Users can share albums, send albums to different device destinations, play a slide show from different content located in different sources. The sharing may be performed utilizing DyACL. |
| MyPeople (DyACL)/My People | Illustrates a map between one group (folder representation) with a group of users. This map could permit edit or delete, based on user needs. |
| MyPeople/[new or edit] (policy manager) | This window can allow the user to specify different policies related to: notification, backup, accessibility, download/upload, and expiration. |
| MyPeople/policy manager/notification | The user can check if there will be a trigger for a notification when there is new content in the folder. The trigger options can be, e.g., never, once, and always. |
| MyPeople/policy manager/Backup | The user can select if the content will be backed up in: My cloud: the backup is composed of the different source storage devices Cloud service provider or 3$^{rd}$ party service Never |
| MyPeople/policy manager/content ability | The user can select if the content shared with other users will be accessible: Never: Content can be accessed only when the source device is on; My cloud: content is available when my cloud is available; Cloud service provider: content will be always available. |
| MyPeople/policy manager/download/upload | The user can set options which allow other members of the group to download or upload content. |
| Mypeople/policy manager/expire | The access of the content can be set to expire after some period of time or never. |
| Search Results | The user can search its own content or the content shared by others. In a preferred embodiment, there is no anonymous content. |
| Sharing content | Displays content to users that are not members of the personal cloud. |
| Content Notification | User can have access to the notification using a widget or via a web site. |

The Personal Cloud system 100 provides the following features that are described in more details below. The features may be implemented through an API 120 call.

The following table illustrates features for the storage consolidation 170.

TABLE 2

Storage Consolidation Functions

| Name | Discovery and aggregation agent-less process |
|---|---|
| Description | Identify and discover of any source of storage at home. The discovery process supports: Ability to add/remove devices DLNA support (agent-less approach) |
| Name | Discovery and aggregation agent process |
| Description | Identify and discover of any source of storage at home. Support for any OS Simple or minimal work to install it Using P2P Tonido technology |
| Name | Data Stores |
| Description | Users can add data stores to their Personal Cloud. Users have the option to import or log their content from those data stores, such as Facebook. |
| Name | General view of the content |
| Description | Users have a complete view of the user generated content (UGC) store in the PC, if the devices are on. |

Global indexing functions may be provided in the system. Each of the personal cloud members generates a local index 550 of their content. This local index 550 provides support for a local search 148. In addition, in one embodiment, at every predefined amount of time or event, this local index 550 is merged with a global index located in the cloud. The global index allows users execute queries to identify data that they can access from any device. These functions are identified in the table below.

TABLE 3

Global Index Functions

| Name | Index |
|---|---|
| Description | Index is a metadata representation of an object. It preferably contains the following fields: Owner ACL Expiration date Resource location Backup options Shared-with (representation of social graph to whom the user has shared their content) Type Cached Updated |
| Name | Local Index |
| Description | Local index preferably keeps an up to date index representation of all the user content generated data from anywhere. Users can execute local search of their content. |
| Name | Global Index |
| Description | Global Index is located in the cloud. It is a compound of multiple local indexes. Global index scales and merges multiple local indexes. |
| Name | Distributed Search |
| Description | User can execute queries to look for content from members of its social graph. The search will be executed at the cloud |
| Name | Distributed Search filters |
| Description | Based on ACL, users can execute queries only in a subset group |

Security functions 142 may be provided in the system. The security functions 142 control access to a user's data. These functions are identified in the table below.

TABLE 4

Security Functions

Authentication

| Name | OpenID |
|---|---|
| Description | Personal Cloud may use OpenID as an authentication mechanism. |

Multi-tenant and data portability support

| Name | OpenId Federation across multiple P.C accounts |
|---|---|
| Description | Running an identity server allows users to act as an OpenID provider. Each sub account may have an OpenID and maps to some storage resource. This sub account can map to the main OpenID account. |
| Name | Data portability |
| Description | If the sub account wants to move or migrate to a main account, the sub account user can remap the storage resource to any other main personal cloud account |
| Name | OAuth support |
| Description | The personal cloud is preferably able to access content store in Facebook, gmail and other $3^{rd}$ party web services that support OAuth |
| Name | OpenId data copy |
| Description | Sub accounts can copy, share, and access content between them. However, the main account could modify this rule. |

ACL

| Name | Social Graph (e.g., Facebook) |
|---|---|
| Description | If the user is member of a social network that provides a representation of his/her social graph, the system can import it and keep and updated version of it. |
| Name | Other Contact (e.g., gmail) |
| Description | The system can retrieve and synchronize user's address book and keep a copy of it |
| Name | DyACL |
| Description | The system can analyze a social graph, address book, and other sources (email) to generate user groups. These groups can have the following exemplary representation: Strong: very active interaction Weak: active interaction Temp: only sporadic interaction |

Data Management

| Name | ACL folder/Notifications |
|---|---|
| Description | Based on DyACL, users can attach some group to a folder. If content is download to this folder, it can generate an automatic message to notify other members of the SN or P.C |
| Name | Automatic Backup |
| Description | Based on a set of rules, the system can back up content to the cloud services provider or any other location. |
| Name | Moving Content/Notification |
| Description | The system can send a notification for possible moving content from a specific source (e.g., cameras, phones, PC) to other sources (e.g., NAS, Cloud, STB). This may comprises a set of rules that user can define. |
| Name | Expiration Dates |
| Description | The System allows users publish content and share the content with others for some amount of time. After that time expires, the sharing access right may expire and only the owner has access to the content. |

The Online Service section has two components: third party online services 400 and Cloud Service Provider online services 300. The platform may provide support to add any online service from these two.

TABLE 5

On-Line Service Functions

Third party Online Services

| Name | Social Networks status updates |
|---|---|
| Description | The system may: publish status updates/twits log status updates/twits |
| Name | Social Network public content |
| Description | The system can publish a link where the user content generated data will be stored. This may be implemented by: User downloading content to the ACL folder; The group members get a notification in their SN; The content (e.g., photos, videos) are displayed in the SN but not uploaded; and other members click in the link and they are redirected to the P.C. |
| Name | Social Networks integration |
| Description | The system has a clear and good integration with SN without breaking the current experiences. |
| Name | Social Graph |
| Description | The system may import his/her social graph to the system |

Cloud Services Provider

| Name | Social Network Gateway |
|---|---|
| Description | The system will have to support the integration of our Social Network Gateway |
| Name | Cloud services |
| Description | Easy integration of all Cloud Server-provided cloud solutions |

The Application Program Interface (API) 120 provides the following functions.

TABLE 6

API Functions

| Name | Storage Consolidation API |
|---|---|
| Description | API may all the metadata regarding the storage consolidation, including, e.g.: Location ACL Ownership Data Management: shared with, expiration date Cache Backup policies |
| Name | Sharing API |
| Description | API to share content between members of a SN or PC |
| Name | Data Management API |
| Description | API that exposes all the features of D.M |
| Name | Search API |

TABLE 6-continued

| | API Functions |
|---|---|
| Description | API to exposes local search and distributed search. |
| Name | ACL API |
| Description | API that allows modification of ACL groups. |
| Name | Personal Cloud Development SDK |
| Description | API that allows modification of ACL groups. |

The distributed social networks section (DiSo) 110 provides the following functions:

TABLE 7

| | DiSo Functions |
|---|---|
| Name | Publishing new content to other members P.C. |
| Description | Users can publish the existence of new content to other members based on the DyACL. The notification of the new content is routed to the right group. |
| Name | Accessing content |
| Description | The access of the content is attached to the DyACL and Data Management. The content is preferably only be displayed or streamed (i.e., not downloaded). Temporary access to specific data can be provided-expiration of the content occurs after some time. |
| Name | Search |
| Description | Users can search in the content of other members of the personal cloud. |
| Name | Publishing new content to other members P.C |
| Description | Users can publish the existence of new content to other members. |

The system may provide a web UI. The Web UI can provide administrative functions, account management, data management, DyACL management. In addition, the system may provide a web UI to display content, such as: Photos, Videos, Chat with other members, Status updates, content navigation and device navigation.

The web UI will preferably be able to support HTML5 and Flash 10. In addition, the web UI should support any device (e.g., IPTV, Mobile, PC, Tablets, and IPad).

TABLE 8

| | User Interface Functions |
|---|---|
| Name | Admin |
| Description | Admin web UI helps the user to add, edit and create new rules. General Admin: a web page may show general details about the behavior of the system |
| Name | Account Management |
| Description | Account Management: shows the current accounts from the system: Main P.C account with his/her SN accounts and subaccounts with their SN accounts |
| Name | DyACL |
| Description | DyACL: Based on some analysis, the system may provide some ACL groups that the user could modify based on his/her needs. In addition, the user could create, add, delete new group of users |

TABLE 8-continued

| | User Interface Functions |
|---|---|
| Name | Data Management |
| Description | Data Management: User may create folders, which one of the attributes may be some group from the DyACL. Once the user pushes some content to this folder, the system automatically publishes the existence of the new content |
| Name | Device Management |
| Description | Device Management: user can add or remove devices that have been discovered using DLNA. In addition, it is possible, with proper authentication, to remove or add new devices, if it is possible. |
| Name | Content navigation |
| Description | User based on his/her account can browse his/her global content. The content preferably has metadata attached with information about ACL |
| Name | Social Network activities |
| Description | User could have the view of all his/her social graph. This includes: Personal Cloud members Social Network members The content display it will be the status updates, messages, notes, post, and emails. |

The system may be implemented on the following exemplary hardware.

TABLE 9

| | Hardware Configuration |
|---|---|
| Name | STB CE4100 Development Platform |
| Description | Personal assistant will run in the STB. The type of STB has to be defined. But for testing purposes, here are some general considerations: Intel Atom CE4100 Processor Fedora Core 1 GB SDRAM 10 GB HD 1 GB NAND Flash 2 HDMI |
| Name | Plug Computing |
| Description | Small energy efficient plug computing device. It has the following specifications: ARM-Based processor (2 GHz) 512 MBDDR2 Ram 512 MB Flash memory No Hard drive Wi-fi Support for various Linux 2.6 Kernel |

Figure 5A:
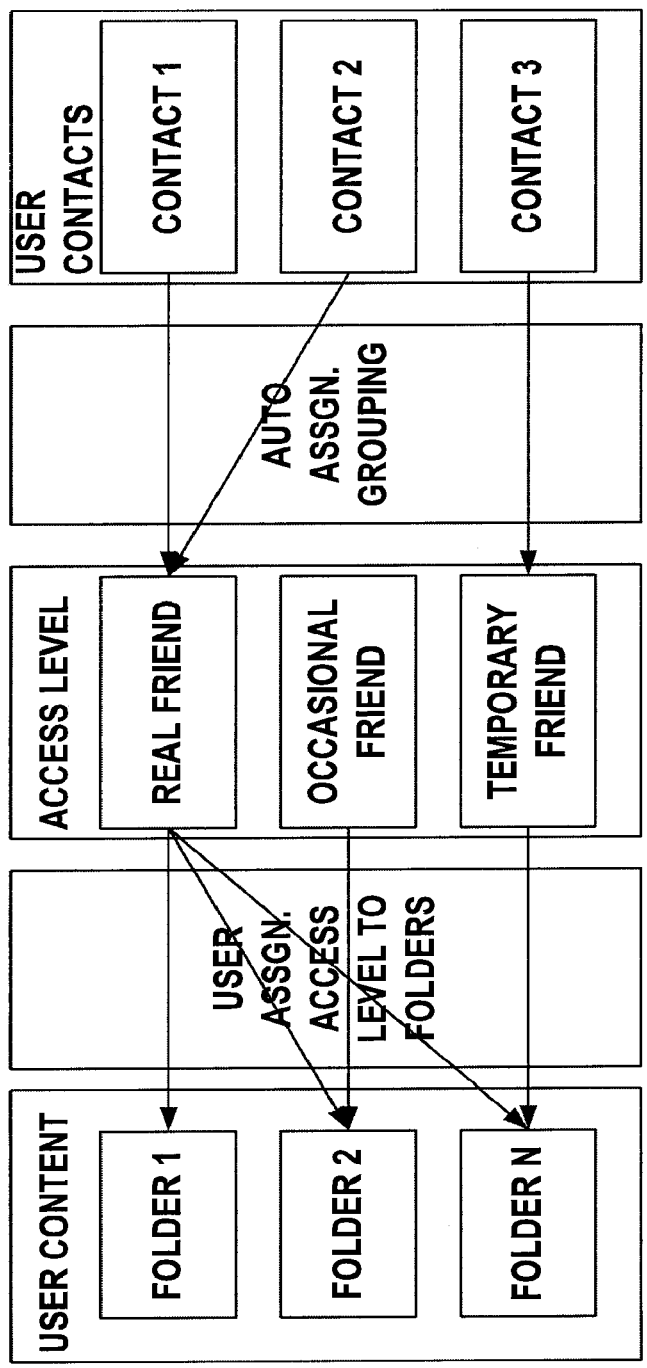
FIG. 5A is a block diagram illustrating the access control functions.

The following section, and referencing FIGS. 5A and B, describes an exemplary user flow of Dynamic Access Control (DyACL) to distribute UGC between members of the personal cloud or third party online services.

Referring to FIG. 5A, the user content may be represented by a series of folders. Based on predefined access levels, the user can associate the various access levels to each of the folders. However, the association of each of the user's contacts to a particular access level is automatically performed by an algorithm described in more detail below. When access to a particular folder is established for a user, based on the automatic assignment to an access level, the contacts associated with that access level are notified in a manner described below. Similarly, when content of a folder is changed, the users having proper access are similarly notified.

Figure 5B:
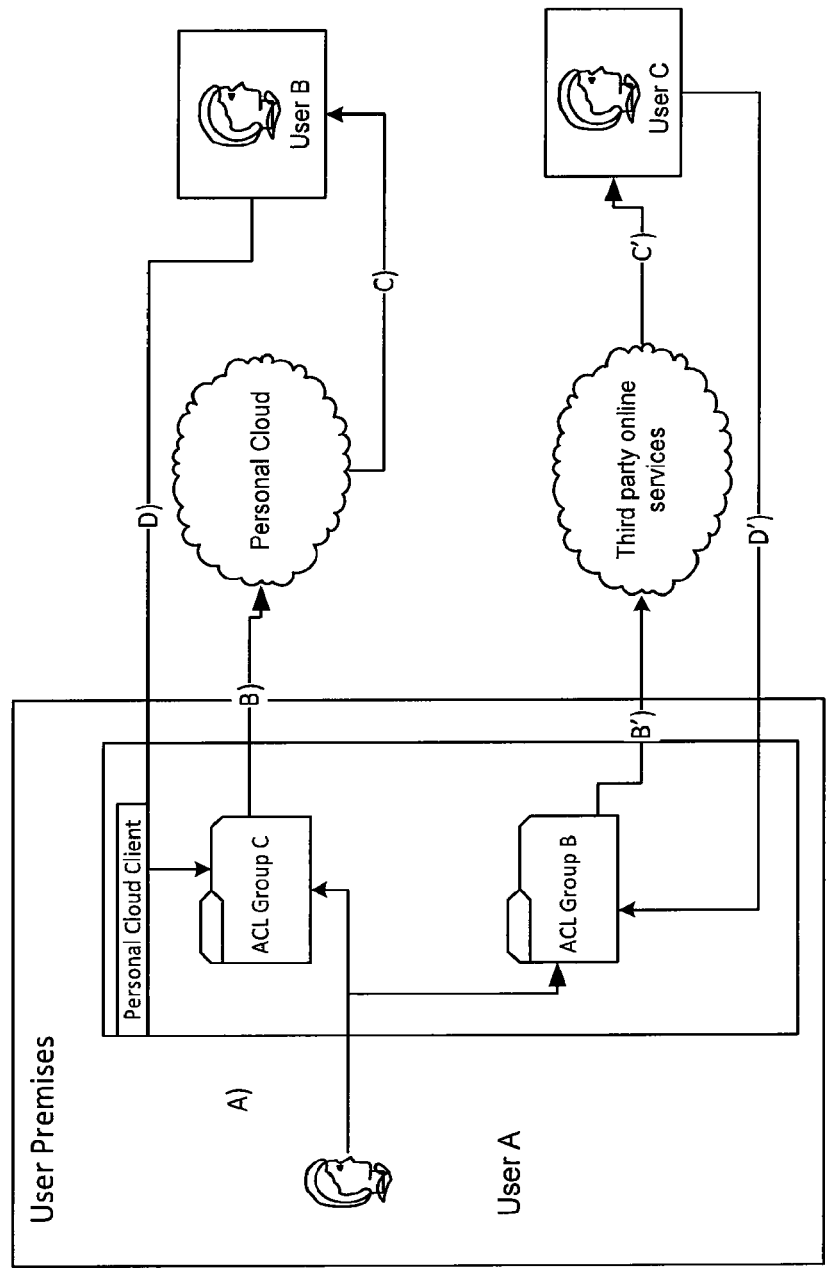
FIG. 5B is a flow diagram illustrating the access control functions according to an exemplary embodiment.

Referring to FIG. 5B, User A is a personal cloud member from an ISP who provides the services. User A has submitted all of the details regarding email, social network, and mobile accounts to the identity manager. Personal Cloud provides to the user a set of ACL rules that represent groups of users based on real communication activities. In addition, those rules are mapped to virtual drives from the personal cloud storage.

Flow: User A Distributed UGC to User B

A) User A uses the personal cloud user interface to drag and drop UGC to the virtual drive call "ACL Group C".
  a. Personal Cloud client executes beforehand the dynamic access control module to analyze, classify, and provide the set of rules attached to the different virtual drives.
B) The existence of new UGC in this virtual drive triggers the system to publish a notification of the existence of new content to other personal cloud members that are part of that group.
  a. The notification is composed of metadata that represent, e.g., access rights, expiration date, location of content, transcoding metadata and other content attributes.
C) Personal Cloud routes the notification to only members of the group. This notification will be show:
  a. Facebook message (email)
  b. Posted in the wall of the user who is part of the group
  c. Send by email
  d. Send by Personal Cloud notification system
D) Based on the notification metadata, other members of the group are able to access the content located at user premises at the personal cloud infrastructure
B') The existence of new UGC in this virtual drive triggers the system to publish a notification to members of this group. However, if the members are not part of the personal cloud service, the system will publish a "post" notification to the third party service using the API provided by them.
C') The members of the group can access the UGC through a URL with the address of the web interface from where the content is hosted
D') The UGC is hosted at the user premises at the personal cloud.

In a preferred embodiment, the Personal Cloud 100 is a service with multiple components that run at a user's premises in hardware that the user gets, e.g., once the user signs a contract with the ISP.

The Identity Manager (I.M) 150 manages the user identity and services such as: email, social network, and mobile accounts. Using the Personal Cloud communication API, the I.M retrieves and stores all of the UGC from the different online third party services 400. The UGC is stored in the Personal Cloud storage 170. Multiple 3rd party online services 400 use OAuth to allow other services to access content that has been stored in their services. OAuth (Open Authorization) is an open standard that allows users to share their private resources stored on one site with another site without having to hand out their credentials.

Figure 6:
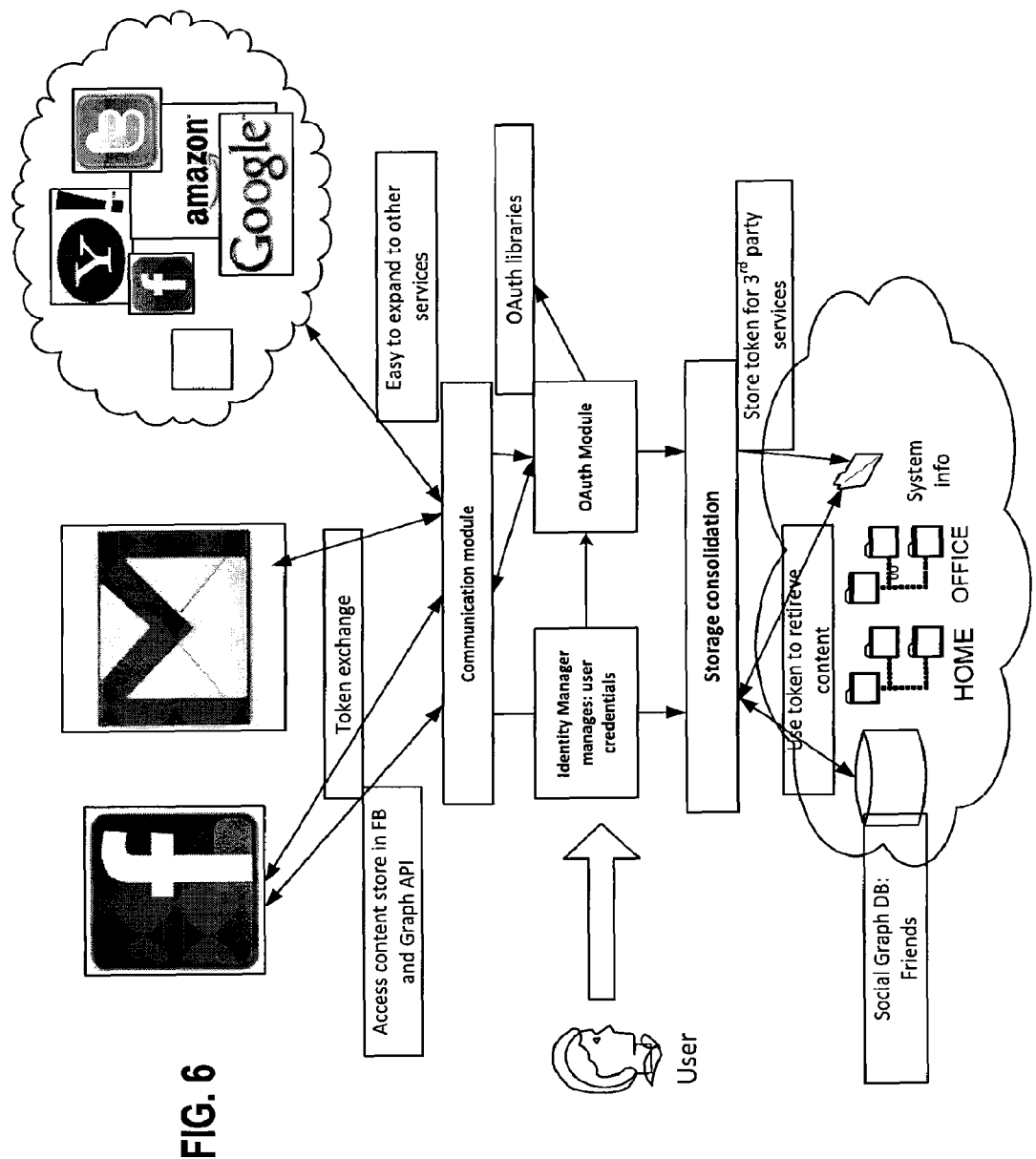
FIG. 6 is a block diagram illustrating the OAuth architecture.

Facebook (http://developers.facebook.com/docs/authentication/) provides multiple examples and libraries how to use OAuth. OAuth is important for a user centric platform because it: allows the user to access content or let other 3rd party services to access content; provides data portability; and it integrates other 3rd party services using a common authorization protocol. FIG. 6 illustrates the OAuth architecture.

An exemplary flow of the Identity Manager 150 is provided as follows. The user can add/remove or edit its information (credentials) regarding social network and email. The system can use the OAuth module to start the exchanging token process with, e.g., Facebook to be able to authorize and authenticate personal cloud to access content from the user. Once the personal cloud has been validated, the Identity Manager 150 extracts, using the graph API, the following exemplary information: Friends, Feed, Home, Photos, Album, Videos, and Events. The content can be stored in the storage consolidation 170. The friends list may be stored in some kind of light/small database for future usage of other modules. The same process could be apply to GMAIL and other 3rd party services that support OAuth.

The Dynamic Access Control Classification is provided as follows. Based on some scheduler, DyACL triggers the Dynamic ACL processing module. The processing module analyzes different data stores (Facebook only for this phase) and content located in the personal cloud storage. It generates a taxonomy and cluster of users based on real human interactions. Once this process is done, the new rules are mapped to current or new virtual drives. The rules are stored in a database.

Figure 7:
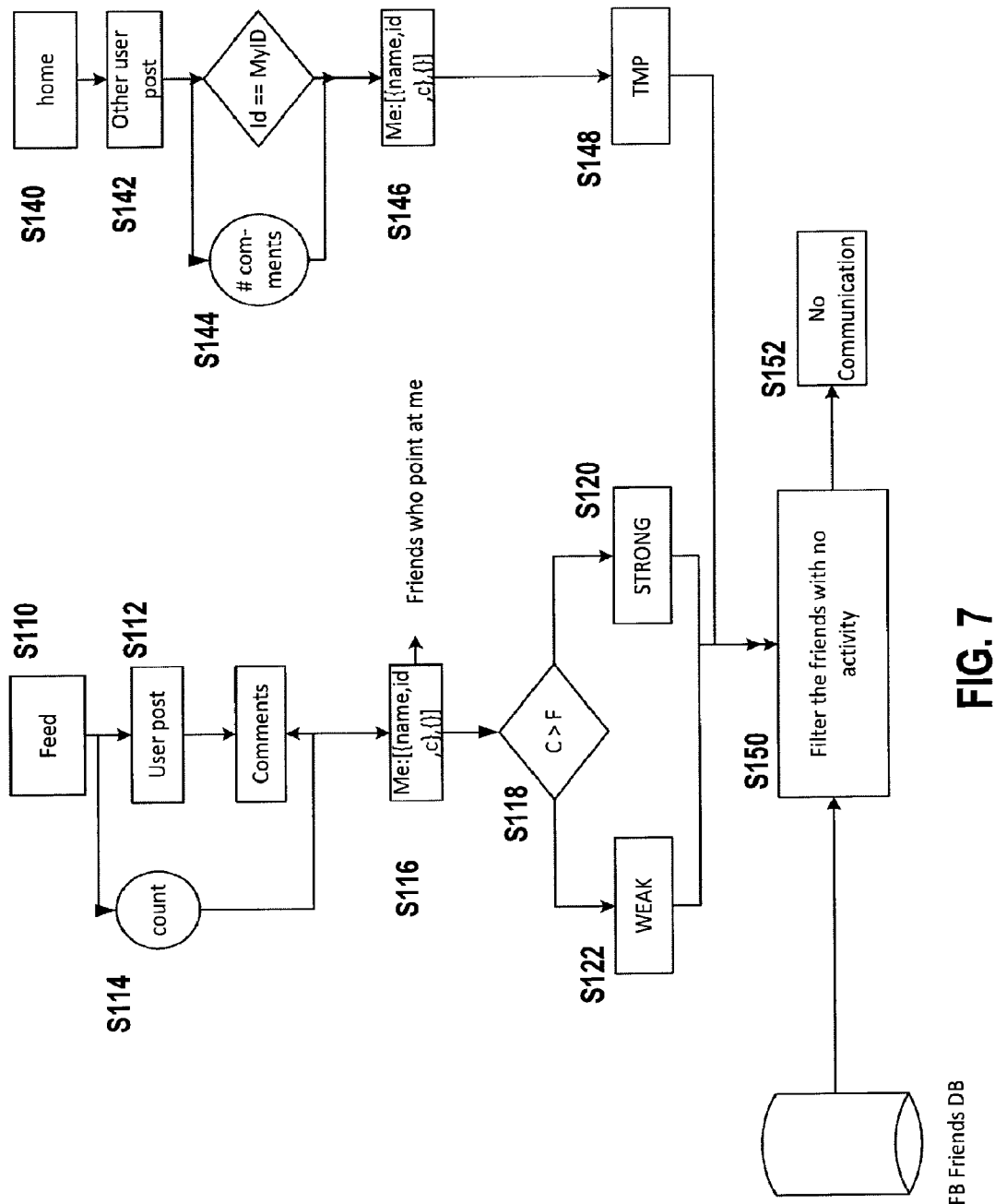
FIG. 7 is a flowchart that illustrates the creation of pre-defined groups based on social network activity.

FIG. 7 is a flowchart that illustrates the creation of predefined groups based on social network activity.

Based on a Facebook social graph API, it is possible to retrieve information from the user, such as friends, home (news feed), and feed (profile feed, also known as a "wall"). This information can be used to identify the user activity centered around Facebook. The classification algorithm is provided below.

The counter of comments in a post provide an important part to measure the activity in the social graph. As can be seen, in the feed S110, users can be identified who have a strong or weak interaction. One possible way of classifying the strength of the interaction is to use the following empiric equation based on term frequency-inverse document frequency (TF-IDF):

$$F = \log\left(\frac{\sum (c1, c2, \ldots, cn)}{\max(c1, c2, \ldots, cn)/\sum \text{Documents}}\right) \quad \text{Eq. 1}$$

where:

c: comments; and

Document: a message that a user publishes in his/her Facebook wall or feed

This equation provides a factor (F) which defines in a statistical fashion the level of communication between the user who posts a message in his/her Facebook wall or feed and the total number of posted comments that his/her friends submitted related to that message. This is calculated as a sum of all messages published on the users wall. Restated linguistically, this factor is defined as:

Log {(Sum of all the comments from one Document)/
 [(Max number of comments for that Document/
 Sum of all the Documents)]}

This equation could be further defined as a function that considers data source material such as, e.g., call log records and email. Significantly, by utilizing this (or similar) equation in an ongoing manner, the group assignments occur continuously (or at discrete points in time, periodically or based on some other timing criteria, such as an event), thereby reflecting a dynamic nature to group membership.

The groups may be classified in the following way:
1. Based on feed (Wall) S110: if there are multiple users that post S112 multiple times in the user wall, it means that they have a direct communication. However, it may be necessary to filter spam.
2. Based on feed (Wall): if the user posts something, all the comments to that post will be counted S114 to define a direct communication.
   a. From the Wall, the following groups are defined S116: strong S120, and weak S122. The feed (wall) in terms of Facebook becomes the home page. If User A post something in his/her wall and his/her friend comments about that post, it means that his/her friends are following all of the social activities from User A. Thus, from the feed (wall), it is possible to define a strong and weak relationships in terms that User A's friends are attending to any message from User A
3. Based on the home feed S140, it will be possible to determine temporary groups. For instance, if a friend posts something S142 and the user commented S144, this implies that the user and friend have some kind of relationship. The difference between blocks S116 and S146 is that, in S146, the system uses the home feed which, in Facebook, is the news feed. In other words, if User A comments on something in User B's page, the system determines that User A is following User B. Thus some temporary relationship can be extracted from this home feed. In block S116, User A posts a message in his/her wall and his/her friends comment about it. In S146, User A posts a comment from somebody else's message.
4. Once the groups (Strong S120, Weak S122, and Tmp S148) are created, the system filters S150 against the entire friends database to identify the no-communication friends.
5. No-communication friends may be used to populate the Source friend list so that the user will be able to create new groups with that information.

In order to perform data management 146, a DyACL rules verification module may be activated to verify the new rules and compare them with the existent ones. If the new rules are the same, the verification module does nothing. If they are new, but the user invalidated them before, the verification module does nothing. If they are new and they have not been produced before, or if the members of the group have changed by some percentage, the validation module can display the new groups to the user through some kind of user interface.

The DyACL manager is in charge to interact with the user to modify the rules. In addition, it provides an API to control the access of the content store in the personal cloud storage.

Figure 8:
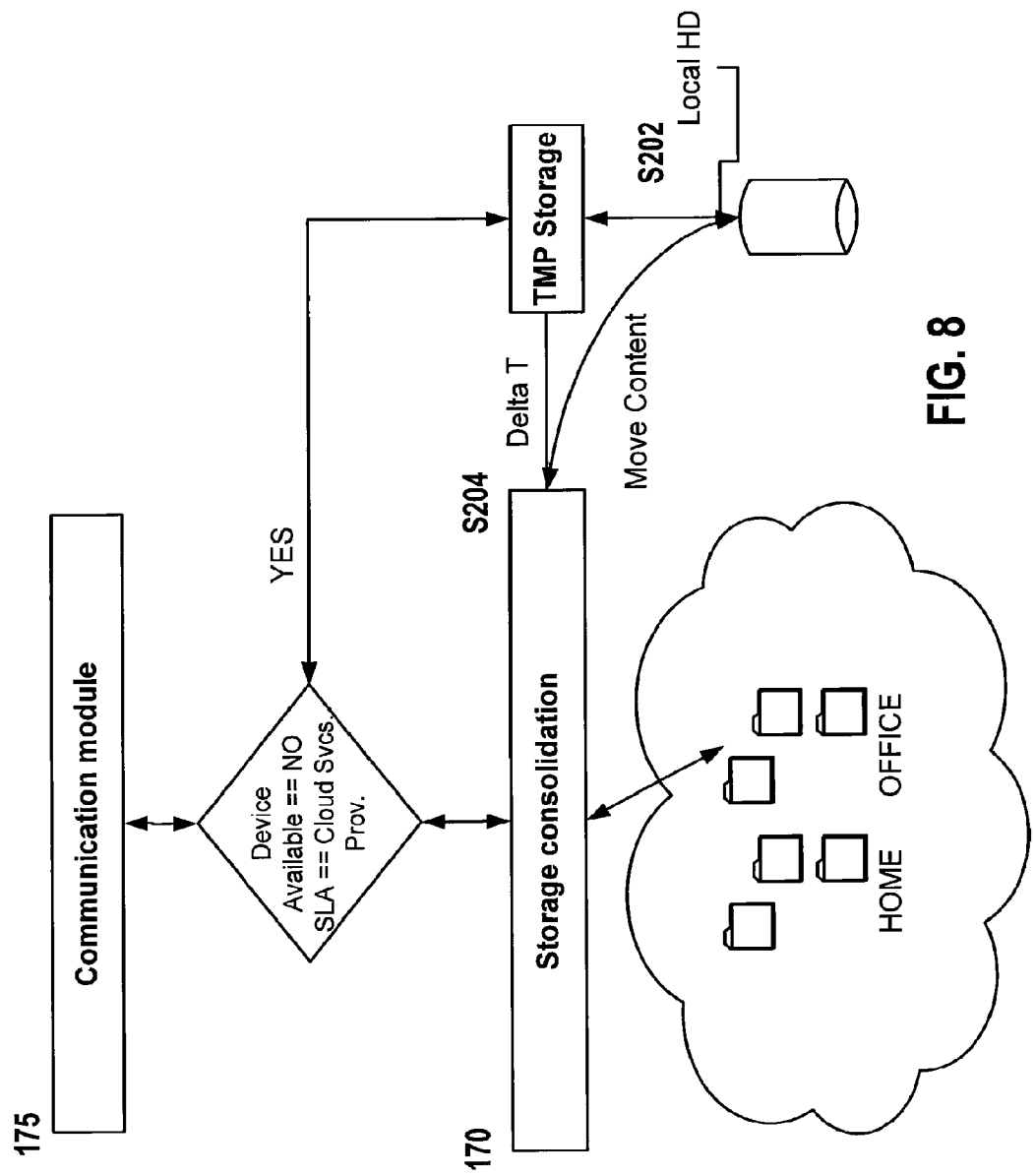
FIG. 8 is a block diagram illustrating a personal cloud SLA.

Exemplary rules are illustrated below, and reference is made to FIG. 8.
   Members of the group (Name, ID, location, OpenID);
   Notification: Once the folder is updated with new content, the following notification may be performed:
      Never notify (manual notification);
      Once: notify only once to the members of the group;
      Always: notify all the time to the other members;
      All of these notifications may be automatic, with some type of acknowledgement.
   Backup: a user could have the choice to do the following:
      Never backup;
      My Cloud: the content are distributed in the devices that are part of the personal cloud using P2P technology;
      Cloud services provider: the content will be backed up at the cloud services provider storage cloud. The content is preferably encrypted.
   Accessibility: a user can have the choice to select the content SLA
      Device: Other users can access the content only if the source device is on;
      My Cloud: The content is available only if any of the devices are available;
      Cloud services provider: The content is always be available. The content could be moved to a local storage S202, or it could be moved to the cloud S204 (storage consolidation 170).
   Download/upload: the user can define read and write permissions.
   Expiration: the user can define if the content store in the folder will expire or not.

Figure 9:
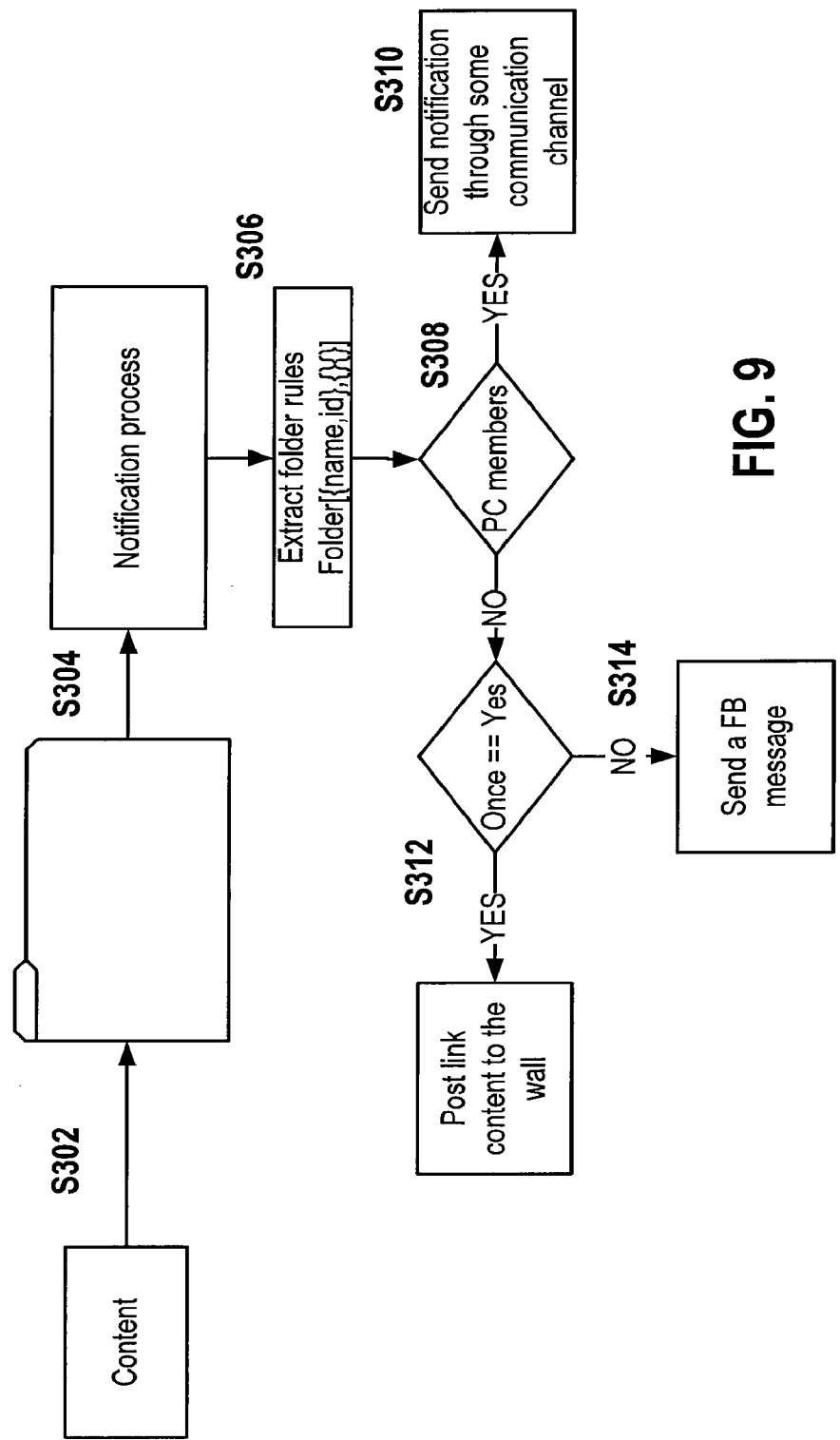
FIG. 9 is a flowchart for notification.

The following describes rule-based content notification. One of the important features of the personal cloud is for a user to distribute to and notify of personal content with other members without breaking the current social network experience. As shown in FIG. 9, when content associated with a user is added or changed S302, the notification process S304 is initiated. A check is made to determine if various individuals to notify are P.C members S308, and if so, notification is sent to them S310 via an appropriate communications channel associated with the P.C.

If they are not P.C. members, if the members are of a social network, e.g., Facebook, the system will check the rules (from S306) and it will extract the Facebook information from its local database to send the notification either by posting it on the wall S312 or sending a direct message to the group S314.

If the member friends are not members of a social network, the system can use some other source of information previously extracted from email sources or address book to deliver the notification.

Figure 10A:
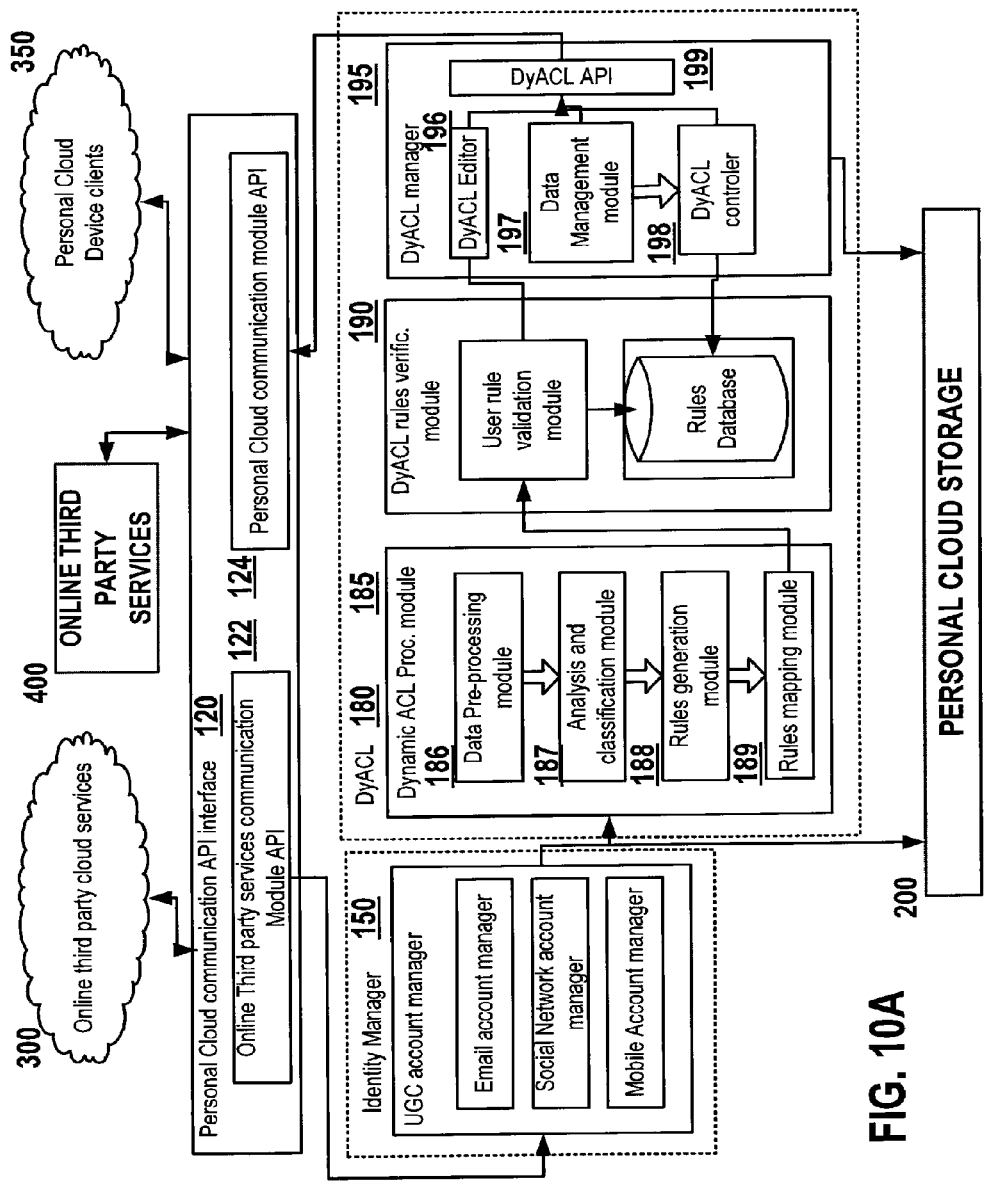
FIGS. 10A & B constitute a block diagram illustrating the dynamic ACL components.
Figure 10B:
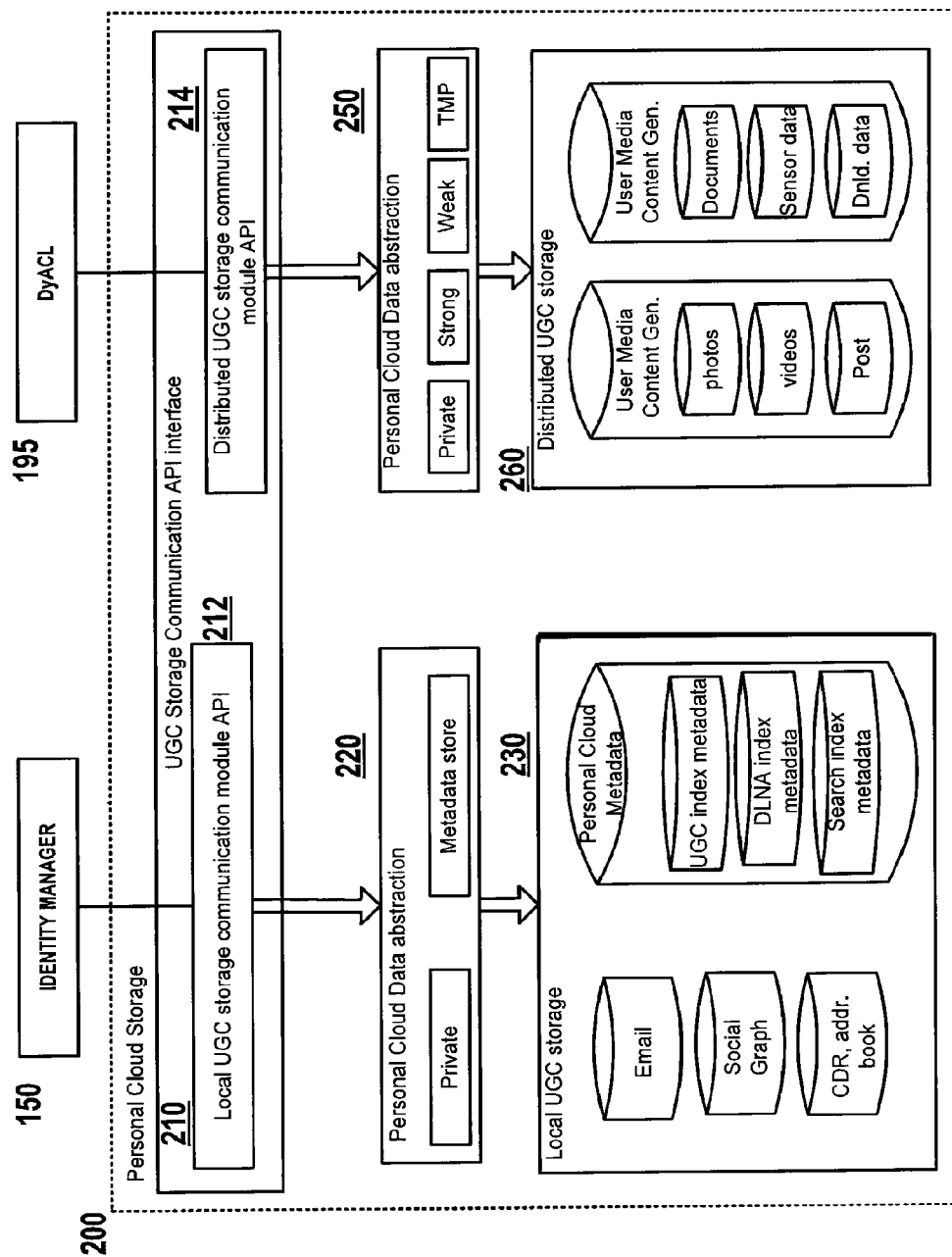

FIGS. 10A and B are an exemplary architecture diagram illustrating various components of the system.

The Personal Cloud Communication API interfaces 120 are a set of API's that allow the communication with other online services or personal cloud services. They include: 1) on-line third-party services communication API 122, which is a set of API's from third party online services that allow user publish and retrieve UGC; and 2) Personal Cloud communication module API 124, which is a set of API that allow communication with other personal cloud clients.

An Identity Manager 150 is a module that is in charge of managing user credentials from a third party online service. The user provides usernames and passwords to access the online services. Using the online third party API 122 and OAuth, the UGC manager downloads the content and stores it at the personal Cloud.

The dynamic ACL module 180 comprises a dynamic ACL processing module 185, a dynamic ACL rules verification module 190, and a dynamic ACL manager module 195.

In the dynamic ACL processing module 185, a data preprocessing module 186 normalizes the content and generates a schema that represent the following fields:
   Facebook friends: Facebook ID, Facebook: Name;
   Feed (Wall): Facebook: name, Facebook ID, Created time, Comments {name, ID}, and Count;
   Home (News): From{Name, ID}, Comments {from{name, id}}, and Count; and
   Devices: storage device source name, and device type {mobile, PC, STB}

In the analysis and classification module 187, based on data mining and other algorithms, this module analyzes the schema and generates a taxonomy and clusters of contacts based on real human activities producing access controls that are more closely related to the user. This module 187 implements Equation 1 and generates a representation of each group. In addition this module 187 can edit and create new groups.

The rules generation module 188 generates DyACL metadata that maps groups with the on-line third-party service 400 and personal cloud users 350. The rules mapping module 189 maps ACL rules to the current or new virtual drives. The DyACL metadata is stored in the rules database.

The DyACL rules verification module 190 is in charge of managing the DyACL metadata store in the rules database.

The DyACL manager 195 provides an API 199 to access and manage the dynamic access control rules. It comprises: 1) a DyACL editor 196 that provides a set of APIs that help the user add, edit or remove the generated rules; 2) a data management module 197 that provides a set of API that allow the user add, edit or remove virtual drives attached to the rules; and 3) a DyACL controller 198 that provides a set of APIs that verify each of the rules to access any kind of content.

The personal cloud storage 200 is a component that represents the storage consolidation from different storage sources. In addition, it provides API to access the content stores in it. The personal cloud storage 200 is can be considered as an abstraction layer where metadata related to the system is stored and the user does not have direct access to this. It includes groups metadata representation, data sources representation used by the system (but not by the user), and personal cloud metadata. Note that this is distinguished from the storage consolidation that represents an aggregation of all the content storage in any device (which a user has access to).

A UGC Storage Communication API 210 comprises a set of APIs that allow other personal cloud components access the UGC. It includes: 1) a local UGC storage API 212, which is a set of APIs that allow accessing the local UGC storage; and 2) a distributed UGC storage API 214, which is a set of APIs that allow other modules to access the content store in different physical storages sources.

The personal cloud data abstraction 220, 250 layer represent the virtual drives for both the local and distributed UGC storage. The local UGC storage 230 is the physical storage attached to the personal cloud hardware, and the distributed UGC storage 260 is the storage consolidation from different sources. The view of all the content may be based on DLNA technology or P2P technology.

Figure 11:
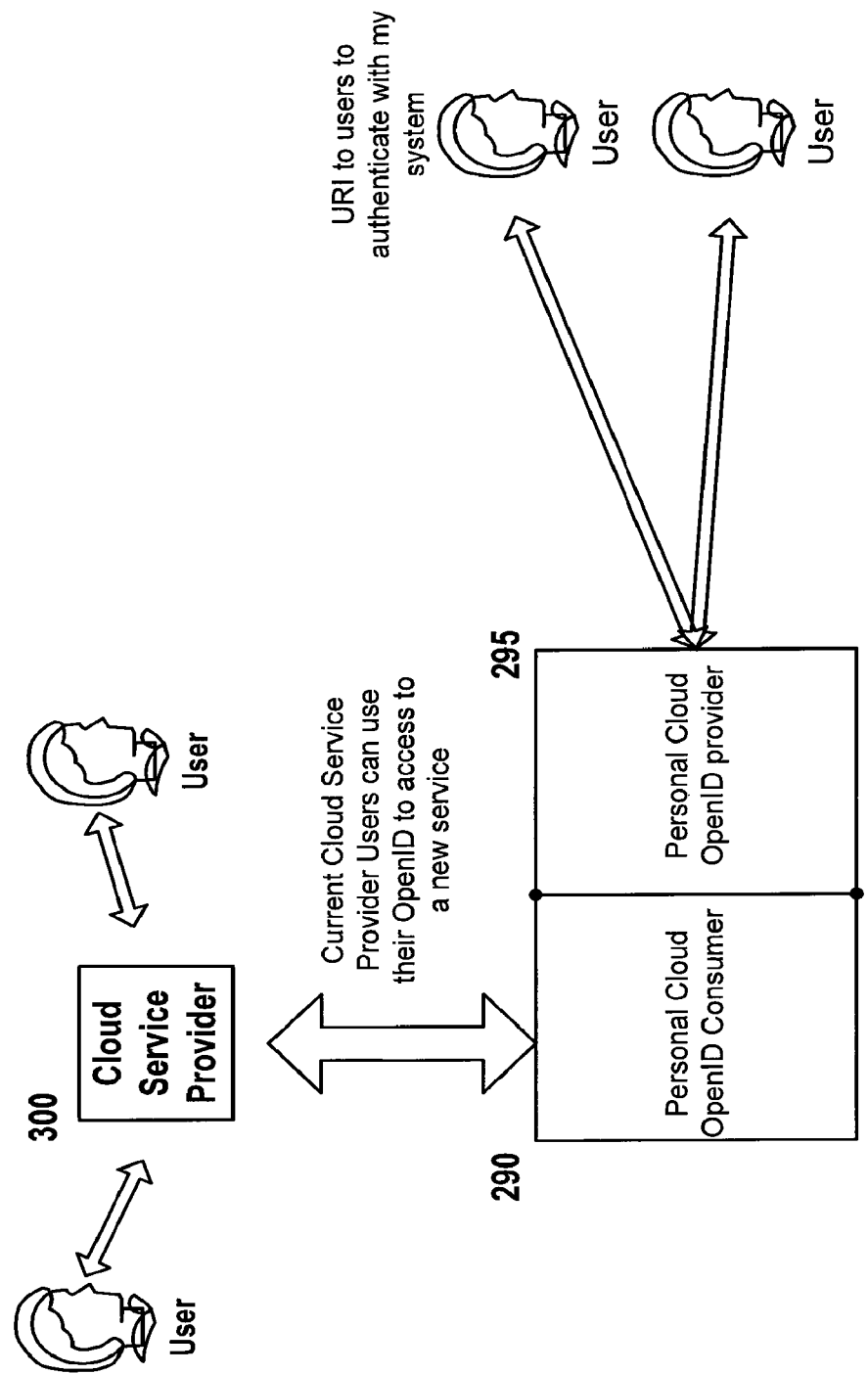
FIG. 11 is a block diagram illustrating OpenID.

FIG. 11 provides an illustration of the OpenID authentication mechanism. Open ID allows users to use an existing account to sign in to multiple websites without needing to create new passwords.

There are two main components. First the personal cloud OpenID consumer 190 represents users that are current using an OpenID provided by a cloud services provider 300 and can use the Open ID to enable a new personal cloud service. Once the user authenticates with the cloud services provider 300, personal cloud will be able to create a profile to map between the cloud services provider 300 Open ID and a Tonido Unique identifier in the TDS.

Second, the personal cloud OpenID provider 295 represents users that can provide an Open ID to other users so that the other users can access the user's personal cloud. These features might include: 1) multi tenant, which provides that multiple members of a house could have their own open ID to access the content. However, access rights are not available once implemented in this case. All the users can see and access all of the content store in the cloud; and 2) security access, which provides that, when a user shares or enables the access to others for some time, the system can provide a temporary Open ID to control the access.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components that perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

TABLE OF REFERENCE CHARACTERS

100 Personal Cloud (P.C)
110 Distributed Social Network (DiSo)
115 Distributed Search (DiSe)
120 application program interface (API)
122 on-line third-party services communication module API
124 personal cloud communication module API
140 MD
146 Data Management (D.M)
148 search
150 Identity Management (I.M)
170 storage consolidation
175 communications
180 dynamic ACL module
185 dynamic ACL processing module
186 data pre-processing module
187 analysis and classification module
188 rules generation module
189 rules mapping module
190 dynamic ACL rules verification module
195 dynamic ACL manager
196 dynamic ACL editor
197 data management module
198 dynamic ACL controller
199 dynamic ACL API
200 personal cloud storage
210 UGC storage communication API interface
212 local UGC storage communication module API
214 distributed UGC storage communication module API
220 personal cloud data abstraction
230 local UGC storage
250 personal cloud data abstraction
260 distributed UGC storage
290 personal cloud Open ID consumer
295 personal cloud Open ID provider
300 cloud service providers
350 personal cloud members
400 on-line third-party service providers
1000 Tonido system
1010 Tonido Domain Server (TDS)
1040 Tonido control link
1045 Tonido data link
1050, desktop computer with Tonido
1050'
1060 remote user access to Tonido desktop

What is claimed is:

1. A method for sharing content of a user with contacts, the method comprising:
    collecting the contacts from said user;
    collecting data related to communications between the user and the user's contacts;
    automatically grouping the contacts into different groups based on a level of the communications between the user and the user's contacts; and
    defining an access level for each group, with each access level granting access to some part of the user's content based on the access level;
    rendering a series of user content folders in a display wherein the quantity of user content folders displayed is based on and equal to in quantity to a number of pre-defined said access levels;
    associating each content folder with one or more access level groups; and
    adding content into one of the content folders, the content being available to a contact in a corresponding said group based on the defined access level of the corresponding group.

2. The method according to claim 1, wherein the associating of each folder comprises either:
    selecting one or more access levels and associating these with the folder; or
    selecting one or more folders and associating these with an access group.

3. The method according to claim 1, wherein the access level comprises real friends, occasional friends, and temporary friends.

4. The method according to claim 1, wherein the automatically grouping is based on social network activity.

5. The method according to claim 4, wherein the automatically grouping is based on social network site information, including friends, news feed, and profile feed.

6. The method according to claim 5, wherein the automatically grouping is based on a classification algorithm that incorporates a counter of comments in a post.

7. The method according to claim 6, wherein the classification algorithm follows the equation:

$$F = \log\left(\frac{\sum(c1, c2, \ldots, cn)}{\max(c1, c2, \ldots, cn)/\sum \text{Documents}}\right)$$

| c: | comments; and |
|---|---|
| Document | a message that a user publishes in his/her Facebook wall or feed |

8. The method according to claim 1, wherein the user's content is stored in a personal cloud.

9. The method according to claim 8, further comprising: retrieving the user's content with an identity manager that retrieves information from multiple on-line sources.

10. The method according to claim 9, wherein access to the user's content is provided using the Open Authorization OAuth standard.

11. The method according to claim 9, wherein the user's content acquired with the identity manager comprises at least one of social network site friend information, feed information, home information, photo information, album information video information, and event information.

12. The method according to claim 1, further comprising: backing up the user content to a cloud services provider.

13. The method according to claim 1, further comprising: notifying each member of each group of contacts having been granted access to that part of the user's content based on the access level when that content has become accessible or has changed.

14. The method according to claim 13, wherein the notifying of each member of each group is based on a notify attribute selected from the group consisting of never notify, which may include manual notification, notify once, and notify all of the time.

15. A non-transitory computer program product, comprising a computer usable medium having a computer readable program code embodied therein, said computer readable program code adapted to be executed to implement a method for sharing content of a user with contacts, said method comprising:
    collecting the contacts from said user;
    collecting data related to communications between the user and the user's contacts;
    automatically grouping the contacts into different groups based on a level of communications between the user and the user's contacts;
    defining an access level for each group, with each access level granting access to some part of the user's content based on the access level;
    rendering a series of user content folders in a display wherein the quantity of user content folders displayed is based on and equal to in quantity to a number of predefined said access levels;
    associating each content folder with one or more access level groups; and
    adding content into one of the content folders, the content being available to a contact in a corresponding said group based on the defined access level of the corresponding group.

16. A server device for sharing content of a user with contacts, the server device comprising:
    a storage element configured to store contacts collected from said user;
    a storage element configured to store data related to communications between the user and the user's contacts; and
    a processor configured to run:
        an algorithm that automatically groups the contacts into different groups based on a level of communications between the user and the user's contacts; and
        an algorithm that defines an access level for each group, with each access level granting access to some part of the user's content based on the access level;
        an algorithm that renders a series of user content folders in a display wherein the quantity of user content folders displayed is based on and equal to in quantity to a number of predefined said access levels;
        an algorithm that associates each content folder with one or more access level groups; and
        an algorithm that adds content into one of the content folders, the content being available to a contact in a corresponding said group based on the defined access level of the corresponding group.

17. A system for sharing content of a user with contacts, the system comprising:
    the server device according to claim 16;
    a client device comprising a reader configured to read the part of the user's content; and
    a network that connects the client device to the server device.

* * * * *